United States Patent
Kumento et al.

(10) Patent No.: US 12,096,389 B2
(45) Date of Patent: Sep. 17, 2024

(54) APPARATUS AND METHOD FOR REGISTERING AN APPARATUS WITH A LONG TERM EVOLUTION (LTE) CELLULAR NETWORK USING A SELECTED ACCESS TECHNOLOGY

(71) Applicant: Nordic Semiconductor ASA, Trondheim (NO)

(72) Inventors: Tuomo Kumento, Trondheim (NO); Aki Rantala, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 379 days.

(21) Appl. No.: 17/606,399

(22) PCT Filed: Apr. 24, 2020

(86) PCT No.: PCT/EP2020/061544
§ 371 (c)(1),
(2) Date: Oct. 25, 2021

(87) PCT Pub. No.: WO2020/216941
PCT Pub. Date: Oct. 29, 2020

(65) Prior Publication Data
US 2022/0201640 A1    Jun. 23, 2022

(30) Foreign Application Priority Data
Apr. 26, 2019 (GB) .................... 1905871

(51) Int. Cl.
*H04W 60/00* (2009.01)
*H04W 48/18* (2009.01)

(52) U.S. Cl.
CPC ........... *H04W 60/00* (2013.01); *H04W 48/18* (2013.01)

(58) Field of Classification Search
CPC .............................. H04W 60/00; H04W 48/18
See application file for complete search history.

(56) References Cited

U.S. PATENT DOCUMENTS 8,064,907 B2 * 11/2011 Gallagher ............... H04W 8/08
370/352
11,350,317 B2 * 5/2022 Guo .................. H04W 36/0022
(Continued)

FOREIGN PATENT DOCUMENTS

| CA | 3132854 A1 * | 9/2020 | ......... H04L 65/1016 |
| CN | 105611596 A * | 5/2016 | |
| EP | 3416430 B1 * | 7/2022 | ........ H04W 36/0033 |

OTHER PUBLICATIONS

3GPP Standard; Technical SPECIFICATION:3GPP TS.304 . . . V13.2.0, Jun. 2016, "3rd Generation Partnership Project; Technical Specification Group Radio Access Network; Evolved Universal Terrestrial Radio Access (E-UTRA); User Equipment (UE) procedures in idle mode (Release 13)" pp. 1-46.

(Continued)

*Primary Examiner* — Khai M Nguyen
(74) *Attorney, Agent, or Firm* — Klarquist Sparkman, LLP

(57) ABSTRACT

An apparatus has a radio for communicating with LTE networks using a first access technology and for communicating with LTE networks using a second access technology. The apparatus is configured to access an identity-data memory storing received identity data. The apparatus includes an access-technology-identification memory for storing access-technology identification information that identifies an access technology associated with identity data stored in the identity-data memory. The apparatus registers with an LTE cellular network, using a selected access technology. The apparatus processes the access-technology identification information to determine whether the identity (Continued)

data stored in the identity-data memory is associated with the selected access technology, and, when it is associated, sends the identity data to the LTE network.

18 Claims, 3 Drawing Sheets

(56) References Cited

U.S. PATENT DOCUMENTS

| | | | | |
|---|---|---|---|---|
| 11,889,391 | B2* | 1/2024 | Shan | H04W 12/08 |
| 2015/0099488 | A1 | 4/2015 | Mildh et al. | |
| 2017/0318452 | A1* | 11/2017 | Hahn | H04W 88/02 |
| 2018/0249405 | A1 | 8/2018 | Dandra et al. | |
| 2021/0136658 | A1* | 5/2021 | Rönneke | H04W 8/20 |
| 2021/0321247 | A1* | 10/2021 | Kim | H04W 8/12 |

OTHER PUBLICATIONS

3GPP Standard; Technical Specification:3GPP TS.401 . . . vol. SA WG2, No. V16.2.0, 2019, Mar. 25, 2019, "3rd Generation Partnership Project; Technical specification Group Services and System Aspects; General Packet Radio Services (GPRS) enhancements . . ." pp. 1-418.

International Search Report and Written Opinion for PCT/EP2020/061544, mailed Jul. 9, 2020, 15 pages.

IPO Search Report under Section 17(5) for GB1905871.8, mailed on Jan. 29, 2020, 3 pages.

"USIM File Extension and Creation of Conformance Test Specification toward LTE Deployment," NTT DOCOMO Technical Journal, vol. 11, No. 3, pp. 31-33.

* cited by examiner

APPARATUS AND METHOD FOR REGISTERING AN APPARATUS WITH A LONG TERM EVOLUTION (LTE) CELLULAR NETWORK USING A SELECTED ACCESS TECHNOLOGY

CROSS REFERENCE TO RELATED APPLICATIONS

This is the U.S. National Stage of International Application No. PCT/EP2020/061544, filed Apr. 24, 2020, which was published in English under PCT Article 21(2), which in turn claims the benefit of Great Britain Application No. 1905871.8, filed Apr. 26, 2019.

BACKGROUND OF THE INVENTION

This invention relates to apparatus and methods for communicating with Long Term Evolution (LTE) cellular networks.

Long Term Evolution (LTE) cellular networks are networks that implement one or more specifications defined by the 3rd Generation Partnership Project (3GPP). These networks enable user equipment (UE), such as cell phones and Internet-of-Things (IoT) sensors, to send and receive data by radio. LTE networks may support various different access technologies, some of which—e.g., LTE Cat-M1 and NB-IoT—are especially optimised for Machine Type Communication (MTC) devices.

In an LTE network, each mobile subscriber (MS) is allocated a unique International Mobile Subscriber Identity (IMSI). The mobile subscriber provides its IMSI to the network when it registers with the network. However, in order to increase subscriber identity confidentiality, by making it harder to track user equipment based on its IMSI, the network—specifically, the Mobility Management Entity (MME)—can then allocate a Globally Unique Temporary Identifier (GUTI) to a mobile subscriber, once the mobile subscriber has registered with the network. The mobile subscriber stores the allocated GUTI in its Universal Subscriber Identity Module (USIM), and can then provide this GUTI, instead of its IMSI, when it next registers with the network. In this way, the IMSI can be transmitted less often, and privacy is enhanced. The network can change the allocated GUTI at intervals to further reduce the ability for user equipment to be identified and traced.

Some user equipment (UE) devices provide multi-mode support for communicating with LTE cellular networks using an access technology that can be selected from two or more options—e.g., selecting between LTE Cat-M1 and NB-IoT.

The present invention seeks to provide improved confidentiality for such devices.

SUMMARY OF THE INVENTION

From a first aspect, the invention provides an apparatus for communicating with Long Term Evolution (LTE) cellular networks, wherein:
 the apparatus comprises a radio for communicating with LTE cellular networks using a first access technology and for communicating with LTE cellular networks using a second access technology, different from the first access technology;
 the apparatus is configured to access an identity-data memory storing identity data received by the apparatus;
 the apparatus comprises an access-technology-identification memory for storing access-technology identification information that identifies an access technology associated with identity data stored in the identity-data memory; and
 the apparatus is configured, when registering with an LTE cellular network using a selected access technology of the first and second access technologies, to process access-technology identification information, stored in the access-technology-identification memory, which identifies an access technology associated with identity data stored in the identity-data memory, to determine whether the identity data stored in the identity-data memory is associated with the selected access technology, and, when the identity data stored in the identity-data memory is associated with the selected access technology, to send the identity data to the LTE cellular network when registering with the LTE cellular network.

From a second aspect, the invention provides a method of registering an apparatus with a Long Term Evolution (LTE) cellular network, wherein:
 the apparatus comprises a radio for communicating with LTE cellular networks using a first access technology and for communicating with LTE cellular networks using a second access technology, different from the first access technology;
 the apparatus is configured to access an identity-data memory storing identity data received by the apparatus; and
 the apparatus comprises an access-technology-identification memory storing access-technology identification information that identifies an access technology associated with identity data stored in the identity-data memory,
the method comprising:
 the apparatus registering with an LTE cellular network, using a selected access technology of the first and second access technologies, wherein said registering comprises the apparatus processing the access-technology identification information to determine whether the identity data stored in the identity-data memory is associated with the selected access technology, and, when the identity data stored in the identity-data memory is associated with the selected access technology, sending the identity data to the LTE cellular network.

Thus it will be seen that, in accordance with the invention, apparatus which supports two different LTE access technologies stores information that associates identity data received by the apparatus (e.g., a Globally Unique Temporary Identifier) with a particular one of the access technologies. This enables the apparatus to decide whether to send this stored identity data when it next registers with the network depending on whether it is using the same access technology or a different access technology.

Without this ability, a device may have to transmit its IMSI every time it registers with the network, to avoid sending inappropriate identification information. This is undesirable because transmitting the IMSI more often allows the device to be tracked more easily. Alternatively, a naïve implementation could cause a device to transmit the same identity data every time it attempts to register with a network, regardless of which access technology has been selected. However, the network may reject the registration attempt if the identity data is not appropriate for the selected access technology. If a device were to repeatedly attempt to connect with inappropriate identity data, in an endless loop, in the worst case, the device could become unresponsive and/or reduce network capacity for other users.

These problems are avoided in embodiments of the present invention, in which access-technology identification information is stored and processed to determine whether identity data stored in the identity-data memory is associated with the selected access technology.

In some embodiments, the apparatus is further configured, when the identity data stored in the memory is not associated with the selected access technology, to register with the LTE cellular network without sending the received identity data. In some such embodiments, the apparatus may be configured first to attempt to register using the received identity data, and, if registration fails, to register with the LTE cellular network without sending the received identity data. This may be useful in case the particular network is capable of recognising the identity data, even though the identity data is associated with a different access technology from the currently selected access technology. However, by then proceeding to register without sending the received identity data (e.g., as a second attempt), if registration has failed, the apparatus can avoid getting stuck in an endless loop.

The apparatus may be configured, when registration fails, to behave differently depending on whether the identity data stored in the identity-data memory is or is not associated with the selected access technology. It may be configured, when registration fails, to make a number of further registration attempts up to a first maximum when the identity data stored in the identity-data memory is associated with the selected access technology, and to make a number of further registration attempts up to a second maximum, lower than the first maximum, when the identity data stored in the identity-data memory is not associated with the selected access technology. The first maximum could be finite or infinite. The second maximum may be zero, one, or more.

The apparatus may comprise user equipment (UE) or a user equipment (UE) device. The apparatus or the radio may comprise a system-on-chip (SoC) or radio-on-a-chip device.

The first and second access technologies may implement respective 3GPP narrowband cellular standards (current or future standards), such as NB-IoT, Cat-0, Cat-M1, Cat-M2, etc. In some embodiments, the first access technology is NB-IoT. In some embodiments, the second access technology is Cat-M1. Apparatus that is switchable between NB-IoT and Cat-M1 may be particularly useful for IoT applications, such as battery-powered sensor devices, since both these access technologies are relatively low power. The radio may be suitable for communicating with LTE cellular networks using a third, fourth or more access technologies, and may be configured to store and process access-technology identification information that identifies an access technology of any of these access technologies. The radio may be configured to be registered with a network using only one of the access technologies at a time. It will be appreciated that references herein to particular standards may refer to any past, current or future releases of these standards.

The apparatus may comprise the identity-data memory (e.g. within a large non-volatile memory of the apparatus), or the identity-data memory may be separate from the apparatus. The identity-data memory may be a memory of a Universal Integrated Circuit Card (UICC)—e.g. allocated to a Universal Subscriber Identification Module (USIM) application on a UICC. The UICC may be regarded as a component of the apparatus or which may be separate from the apparatus. The apparatus may comprise an interface for removably receiving the identity-data memory—e.g., it may comprise a UICC slot or other smart card interface. Alternatively, the identity-data memory may be integrated with the radio—e.g., carried on a common circuit board or silicon chip; it could be part of an embedded UICC (eUICC).

The apparatus may be configured to receive the identity data using the radio. The identity data may be network-allocated identity data. The apparatus may be configured to receive the identity data from an LTE cellular network—which may be the same LTE cellular network or a different LTE cellular network from the LTE cellular network with which the apparatus next attempts to register.

The identity data received by the apparatus may comprise data relating to the identity of the apparatus. It may comprise a temporary identifier allocated to the apparatus by the network. It may comprise or be a Globally Unique Temporary Identifier (GUTI). The identity data may have been provided to the apparatus by a Mobility Management Entity (MME)—e.g., during a previous network registration.

In some embodiments, the identity data received by the apparatus may additionally or alternatively comprise data that identifies a tracking area of the network. In particular, the identity data may comprise a last-visited registered Tracking Area Identity (TAI). In some embodiments, the identity data comprises both a GUTI and a last-visited registered TAI.

The apparatus may be configured to write identity data, received by the apparatus, to the identity-data memory. It may be configured to write the data to a file of a USIM (e.g. on a UICC). It may write some or all of the identity data to an EF_Evolved Packet System Location Information (EF_EPSLOCI) file.

The apparatus may be configured to read the identity data from the identity-data memory every time the apparatus registers with a network using any access technology, or may be configured to read the identity data only when the selected access technology matches the stored access-technology identification information.

The apparatus may send some or all of the identity data, stored in the identity-data memory, in an Access Request message, when registering with the LTE cellular network.

In some embodiments, only identity data for one network registration is stored by the apparatus—e.g., the most recent GUTI or other identity data provided to the apparatus by an LTE network. This may be desirable in order to comply with specifications (e.g., if a standard USIM or UICC only has storage for only one GUTI).

However, in other embodiments, the apparatus may comprise first identity-data memory for storing identity data associated with the first access technology and may further comprise second identity-data memory for storing identity data associated with the second access technology. In such embodiments, the access-technology identification information may comprise explicit data stored on the apparatus that associates an access technology with data stored in the first and/or second identity-data memories, or the information may be inherent in the stored identity data—for example, being implicit in the location (e.g., memory address) of each stored identity data.

When registering with an LTE cellular network, the apparatus may transmit the identity data to the network. It will be appreciated that, in some circumstances, the identity data may be modified or encoded differently when transmitted by the apparatus compared with how the identity data was received by the apparatus and/or how the identity data is stored in the identity-data memory.

A single memory device (e.g. chip) may comprise both the access-technology-identification memory and the identity-data memory. The access-technology-identification memory may be a memory of a UICC or USIM. In some embodiments, the access-technology identification information may be written to a file on the UICC—e.g. to a file dedicated to storing the access-technology identification information, or to an element in a file that can also store other information, such as the last-registered Public Land Mobile Network (PLMN)—e.g. a modified EL_EPSLOCI file. However, in other embodiments, the access-technology-identification memory is separate from the identity-data memory. The access-technology-identification memory may be a region of non-volatile memory of the apparatus, distinct from a UICC or USIM containing the identity-data memory.

The access-technology identification information may identify an access technology associated with stored identity data by identifying the access technology used by the apparatus when the apparatus received the identity data from an LTE cellular network. The apparatus may be configured to write the access-technology identification information to the access-technology-identification memory. The access-technology identification information may encode the access technology associated with the identity data in any appropriate way—e.g., with a first predetermined value representing the first access technology and with a second predetermined value representing the second access technology. The access-technology identification information may identify the access technology used in the most-recent network registration by the apparatus—i.e. the last-registered access technology. This access technology may correspond to the access technology used to access a network identified by the "Last visited registered Tracking Area Identity (TAI)" element of the EF_EPSLOCI file in the USIM. The apparatus may update the access-technology identification information after each successful network registration using the first or second access technology and/or whenever the network provides an updated GUTI (e.g., when the identity data comprises a GUTI) and/or whenever the apparatus moves to a different tracking area while still registered to the network (e.g., when the identity data comprises a last visited registered TAI).

The selected access technology may be selected by a human user of the apparatus, or by logic on the apparatus, or by an external apparatus such as a component connected to an LTE network. The second access technology may be selected by the apparatus in response to the apparatus determining that no network connection supporting the first access technologies is available to the apparatus, or vice versa.

The apparatus may comprise any one or more of: processors, memory for storing software instructions, memory having software instructions stored therein, digital logic, analogue circuitry, DSPs, power supplies, user interfaces, sensors, etc. It may comprise an integrated-circuit radio-on-a-chip. Any of the operations disclosed herein may be carried out partly or wholly by software executing on the apparatus, or partly or wholly by hardwired digital logic on the apparatus, or any mixture of these.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Although the invention has been disclosed in the context of Long Term Evolution (LTE) cellular networks, this is not essential to all aspects. Thus from further aspects, the invention provides apparatus and methods for communicating with cellular networks, more generally, having all the feature disclosed herein but with references to LTE omitted.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
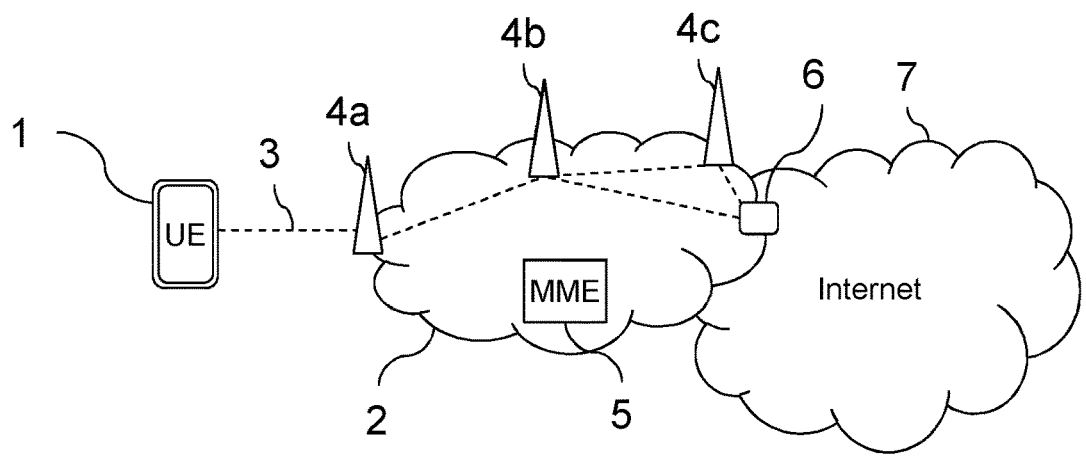
FIG. 1 is a schematic drawing of a telecommunications system in which the invention can be implemented.

FIG. 1 shows a User Equipment (UE) device 1, such as a wireless temperature sensor, which contains a radio receiver and a radio transmitter for communicating with a cellular telecommunications network 2 which supports one or more LTE narrowband access technologies, such as LTE Cat-M1 (LTE-M) or LTE NB-IoT.

The device 1 can receive data from the network 2 over a radio link 3 on a narrowband channel. The network 2 comprises an Evolved Universal Terrestrial Radio Access Network (E-UTRAN) and includes a number of LTE eNodeB base stations 4a-4d. The network 2 also includes a Mobile Management Entity (MME) 5 and a Serving Gateway 6. The Serving Gateway 6 enables the device 1 to communicate over the Internet 7—e.g., with a remote server (not shown). Other standard components of an LTE network are omitted for simplicity.

Any number of other UE devices may be receiving data from the same base station 4a at the same time as the device 1. These may be other LTE-M devices, or devices using other categories of LTE, such as for voice communication.

The MME 5 allocates temporary identifiers, known as Globally Unique Temporary Identifiers (GUTIs), to the devices that register with the network 2, in known manner.

The device 1 embodies the present invention and also implements methods embodying the present invention, as described below.

Figure 2:
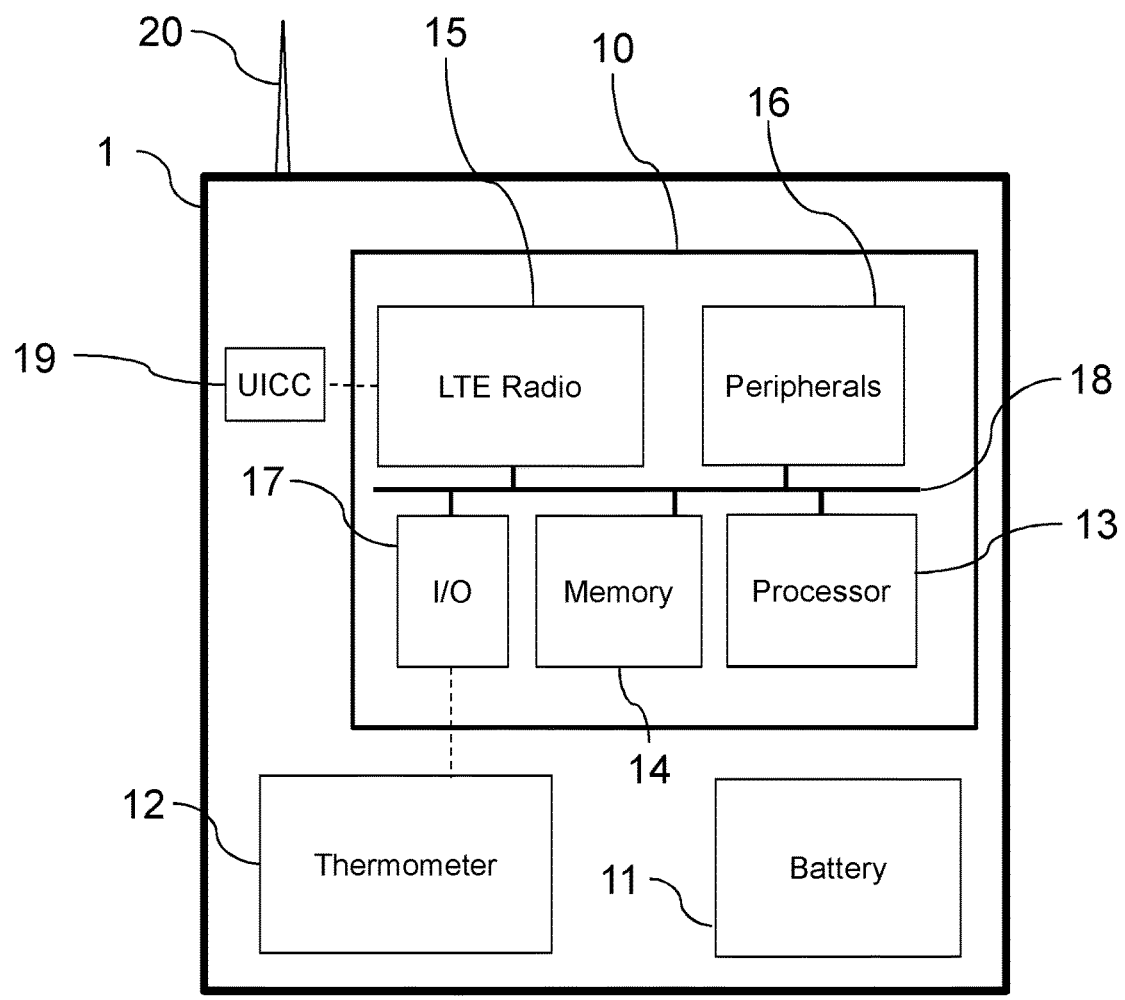
FIG. 2 is a schematic drawing of a wireless temperature sensor embodying the invention.

FIG. 2 provides more detail of an exemplary device 1, which, in this example, is a wireless temperature sensor. (Of course, the invention may also be implemented in many other types of device, including cell phones, computers, machine-to-machine (M2M) type devices, etc.)

The wireless temperature sensor device 1 contains an integrated-circuit radio-on-a-chip 10, a battery 11 and a thermometer 12. It may also contain other discrete components, such as PCBs, further processors or SoCs, oscillators, capacitors, resistors, a housing, user interface features, etc. which are omitted from FIG. 2 for the sake of simplicity.

The radio chip 10 contains a processor 13, memory 14 (which may include volatile and non-volatile memory types), an LTE radio 15 which supports LTE Cat-M1 and NB-IoT protocols, general peripherals 16 (which may include a hardware cryptography engine, digital-to-analogue converters, timers, etc.), and input/output peripherals 17 (e.g., a USB interface). These elements are all connected to a bus system 18 (e.g., compliant with the Arm™ Advanced Microcontroller Bus Architecture) which supports direct memory access (DMA) to the memory-mapped peripherals 16, 17. In one example, the processor 13 is an Arm™ Cortex™-M series processor, although it could be any type of processor.

The LTE radio 15 includes a direct-conversion receiver, as well as a radio transmitter. It contains digital logic and analogue components that will be familiar to one skilled in the art. Among other components, the LTE radio 15 includes a local oscillator and a channel filter for tuning narrowband LTE signals. The radio 15 may, of course, also support other radio protocols, such as Global Positioning System (GPS) protocols, broadband LTE categories, etc.

The radio chip 10 is communicatively coupled with a Universal Integrated Circuit Card (UICC) slot, which can contain a removable UICC 19. The radio 15 can communicate with the UICC 19 through a standard interface. In other embodiments, the device 1 may contain a built-in hardware eUICC, or a software-implemented USIM, instead of a removable UICC 19.

The LTE radio 15 may contain its own general-purpose processor (not shown) for executing software implementing features of the Cat-M1 and NB-IoT radio protocols. The LTE radio 15 and radio chip 10 may contain other conventional components, such as DSPs, amplifiers, filters, ADCs, DACs, etc. The device 1 also has an antenna 20 which is connected to the radio chip 10 via appropriate off-chip components (not shown).

The memory 14 stores software which is executed by the processor 13 for controlling the operation of the wireless temperature sensor device 1. In use, the processor 13 uses the I/O peripherals 17 to fetch temperature readings from the thermometer 12 at intervals and writes these to the memory 14. The processor 13 sends a log to a remote server at periodic intervals (e.g., hourly, or daily). The device 1 can also receive data from the remote server, such as acknowledgement messages, new configuration settings, and firmware updates.

When first powered on, the radio 15 will seek a Cat-M1 or NB-IoT network with which to register, based on standard LTE protocols. The radio 15 may be configured (e.g. by a user or distributer) to attempt to register using a selected one of Cat-M1 and NB-IoT, or it may attempt to register with whichever of the network technologies is available. The very first registration with a particular network 2 will require the radio 15 to fetch the International Mobile Subscriber Identity (IMSI) from the UICC 19 and transmit this IMSI the network. Once registered, however, the network 2 can allocate a GUTI to the USIM application on the UICC 19. The radio 15 will write the GUTI (which embodies the identity data disclosed herein), along with the last visited registered TAI (which may also embody identity data as disclosed herein), to the EF_EPSLOCI file on the USIM. The radio 15 also stores data, such as a label, identifying the access technology associated with the received identity data as being "Cat-M1" or "NB-IoT" to the device memory 14, or—in some embodiments—to the USIM application on the UICC 19 (e.g., as an extension to the EF_EPSLOCI file, or as a separate file). This label may take any suitable form, and embodies the access-technology identification information disclosed herein.

When next registering with a network using a selected access technology, the radio 15 processes the stored access-technology identification data to determine whether the access technology associated with the stored identity data matches the current selected access technology. If so, it sends the stored GUTI, from the USIM, to the network as an identifier in an Attach Request message. If not, it sends the IMSI, or—in some embodiments—it sends the stored GUTI in a first attempt, but sends the IMSI in a second registration attempt if the first registration fails. The radio 15 may also include the stored "last visited registered TAI" in the Attach Request when the access technology matches, but not include this stored data in the Attach Request when the access technology has changed.

Figure 3:
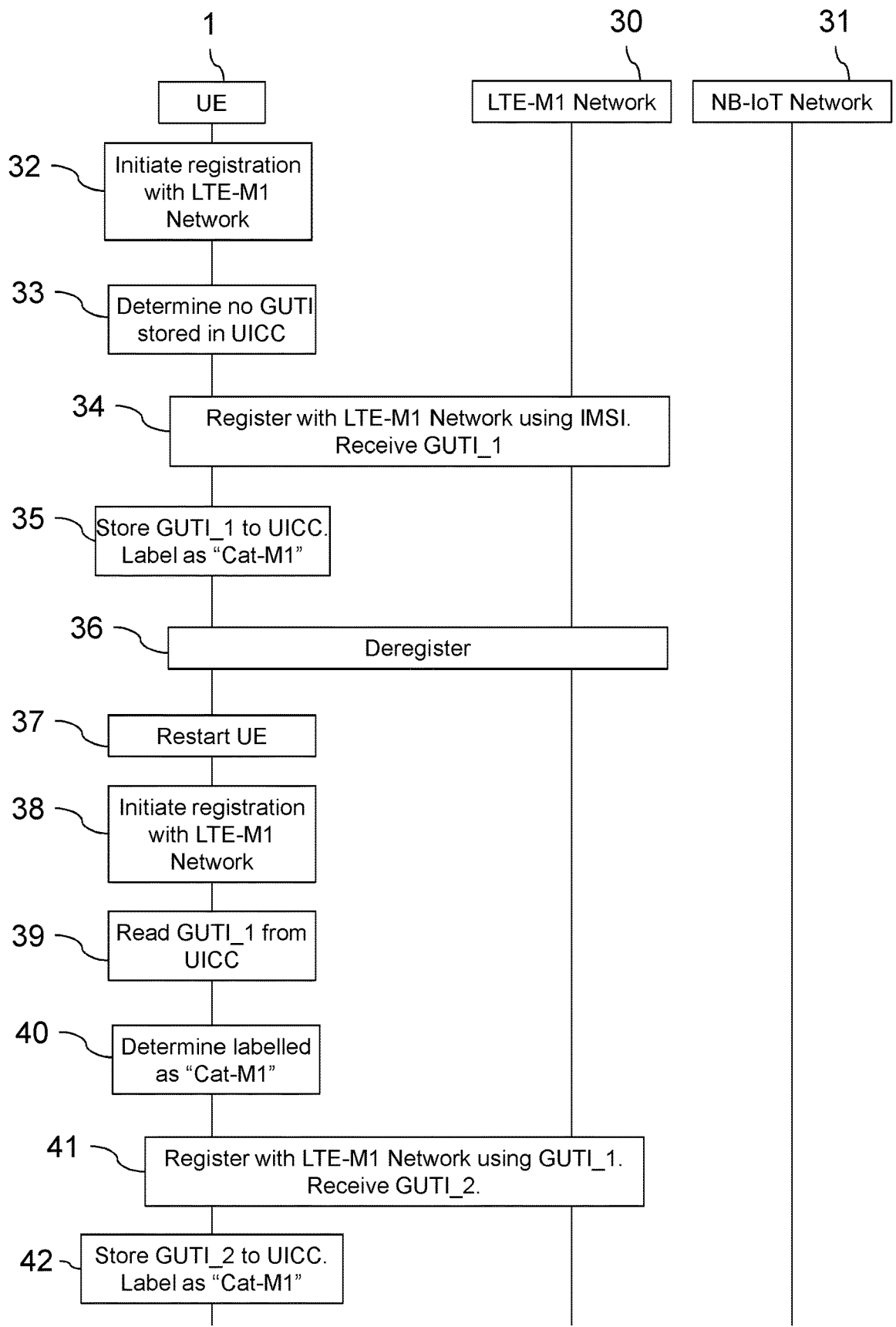
FIG. 3 is a message sequence chart showing a device embodying the invention registering and re-registering with the same network.
Figure 4:
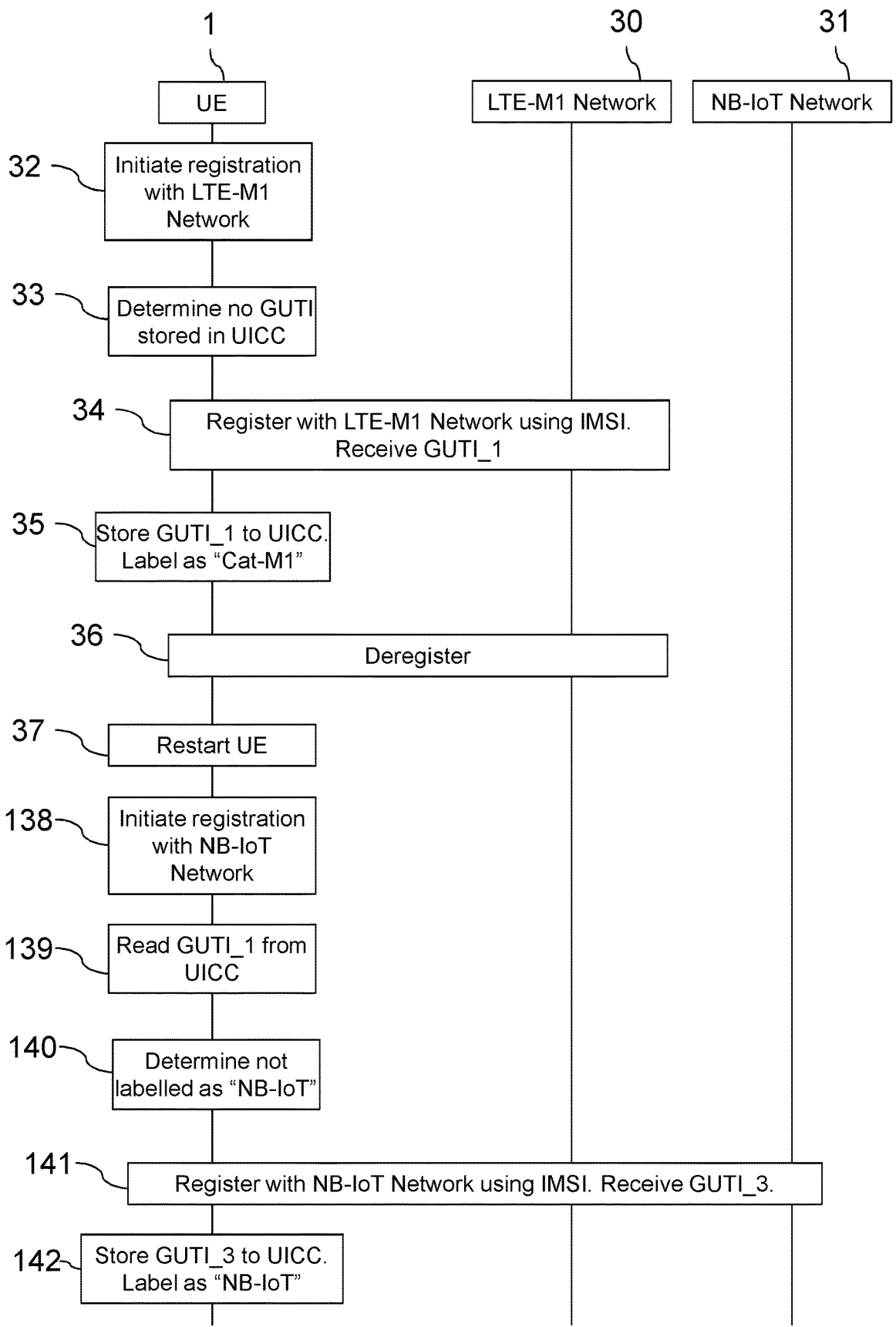
FIG. 4 is a message sequence chart showing a device embodying the invention registering with a first network then registering with a second network using different access technology.

FIGS. 3 & 4 illustrate these processes for a UE device 1 that can connect, at different times, to an LTE-M1 network 30 and to an NB-IoT network 31.

In FIG. 3, the UE device 1 initiates registration with the LTE-M1 network 30 in a first step 32. In a second step 33, the device 1 checks whether the UICC 19 has a GUTI stored in the EF_EPSLOCI file of the USIM application. Normally there will be a GUTI, but there may not be when the UICC 19 is used for the first time, or if the data has been cleared for some reason. In this example, the device 1 determines there is no GUTI stored. The device 1 therefore registers 34 with the LTE-M1 network 30 using its IMSI. Once authenticated and registered, the device 1 receives a GUTI from the LTE-M1 network 30, here called GUTI_1. The device 1 writes 35 GUTI_1 to the EF_EPSLOCI file on the UICC 19. It stores a value in memory 19 that indicates that the stored GUTI value was received from a network 30 using the LTE-M1 access technology.

Sometime later, the device 1 deregisters from the LTE-M1 network 30. The device may optionally be restarted 37, for example.

Later still, the device 1 initiates a new registration process 38. The same LTE-M1 network 30 is selected—e.g., by a user, or by software or configuration settings on the device 1, or due to network availability, or a combination of factors. The device 1 reads 39 the GUTI_1 from the UICC 19. It also reads the stored value from memory 19 or the USIM and determines 40 that GUTI_1 is associated with the LTE-M1 access technology and that this is still the currently selected technology, which it is in the instance. The order of steps 39 and 40 may, of course, be reversed in some embodiments. The device 1 then registers 41 with the LTE-M1 network 30 (or with a different LTE-M1 network) using the GUTI_1 identifier. Once registered, it may receive an updated GUTI—GUTI_2—which it may store 42 to the UICC 19, overwriting GUTI_1. If registration fails for some reason, the device 1 may make repeated attempts at registering, all using GUTI_1.

In FIG. 4, the same initial steps 32-37 are performed, but when the device 1 initiates a new registration 138 in this example the access technology has been changed to NB-IoT. This may be due to a user selection, or a software or configuration selection, or a network operator selection, or due to physical network proximity, or a combination of factors.

The device 1 reads 139 the GUTI_1 from the UICC 19. It also reads the stored value from memory 19 or the USIM. It determines 140 that GUTI_1 is associated with the LTE-M1 access technology and that this is not the currently selected technology. The order of steps 139 and 140 may, of course, be reversed in some embodiments, and the reading 139 of the GUTI may be omitted if the access-technology identification information can be checked without having to read the GUTI.

The device 1 then registers 141 with the NB-IoT network 31 using the IMSI again, since the GUTI_1 identifier may be rejected. Once registered, it may receive an updated GUTI—GUTI_3—which it may store 42 to the UICC 19, overwriting GUTI_1. Alternatively, in some embodiments, the device 1 may attempt to register using GUTI_1, but may use IMSI on a second and subsequent attempts, if registration fails.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An apparatus for communicating with Long Term Evolution (LTE) cellular networks, wherein:
   the apparatus comprises a radio for communicating with LTE cellular networks using a first LTE access technology and for communicating with LTE cellular networks using a second LTE access technology, different from the first LTE access technology;
   the apparatus is configured to access an identity-data memory storing identity data received by the apparatus;
   the apparatus comprises an access-technology-identification memory for storing access-technology identification information that identifies an LTE access technology associated with a Globally Unique Temporary Identifier (GUTI) stored in the identity-data memory; and
   the apparatus is configured, when registering with an LTE cellular network using a selected LTE access technology of the first and second LTE access technologies, to process the access-technology identification information, stored in the access-technology-identification memory, which identifies an LTE access technology associated with the GUTI stored in the identity-data memory, to determine whether the identity data the GUTI stored in the identity-data memory is associated with the selected LTE access technology, and, when the GUTI stored in the identity-data memory is associated with the selected LTE access technology, to send the GUTI to the LTE cellular network when registering with the LTE cellular network.

2. The apparatus of claim 1, wherein the apparatus is further configured, when the GUTI stored in the memory is not associated with the selected LTE access technology, to register with the LTE cellular network without sending the GUTI to the LTE cellular network.

3. The apparatus of claim 1, wherein the apparatus is configured first to attempt to register with the LTE cellular network using the GUTI stored in the identity-data memory, and, if registration fails, then to register with the LTE cellular network without sending the GUTI stored in the identity-data memory.

4. The apparatus of claim 1, configured, if registration fails, to make a number of further registration attempts up to a first maximum number when the GUTI stored in the identity-data memory is associated with the selected LTE access technology, and to make a number of further registration attempts up to a second maximum number, lower than the first maximum number, when the GUTI stored in the identity-data memory is not associated with the selected LTE access technology.

5. The apparatus of claim 4, wherein the second maximum number is zero or one.

6. The apparatus of claim 1, wherein the first and second LTE access technologies implement different respective 3GPP LTE narrowband cellular standards.

7. The apparatus of claim 1, wherein the first LTE access technology is NB-IoT.

8. The apparatus of claim 1, wherein the second LTE access technology is Cat-M1.

9. The apparatus of claim 1, wherein the apparatus comprises the identity-data memory.

10. The apparatus of claim 1, wherein the identity-data memory is a memory of a Universal Integrated Circuit Card (UICC).

11. The apparatus of claim 1, wherein the identity data comprises a last-visited registered Tracking Area Identity (TAI).

12. The apparatus of claim 1, wherein the access-technology-identification memory is a memory of a UICC.

13. The apparatus of claim 1, wherein the access-technology-identification memory is a region of non-volatile memory of the apparatus that is not within a UICC.

14. A method of registering an apparatus with a Long Term Evolution (LTE) cellular network, wherein:
   the apparatus comprises a radio for communicating with LTE cellular networks using a first LTE access technology and for communicating with LTE cellular networks using a second LTE access technology, different from the first LTE access technology;
   the apparatus is configured to access an identity-data memory storing identity data received by the apparatus; and
   the apparatus comprises an access-technology-identification memory storing access-technology identification information that identifies an LTE access technology associated with a Globally Unique Temporary Identifier (GUTI) stored in the identity-data memory,
the method comprising:
   the apparatus registering with an LTE cellular network, using a selected LTE access technology of the first and second LTE access technologies, wherein said registering comprises the apparatus processing the access-technology identification information to determine whether the GUTI stored in the identity-data memory is associated with the selected LTE access technology, and, when the GUTI stored in the identity-data memory is associated with the selected LTE access technology, sending the GUTI to the LTE cellular network.

15. The method of claim 14, further comprising, when the GUTI stored in the identity-data memory is not associated with the selected LTE access technology, the apparatus registering with the LTE cellular network without sending the GUTI to the LTE cellular network.

16. The method of claim 14, further comprising the apparatus first attempting and failing to register with the LTE cellular network using the GUTI stored in the identity-data memory, then registering with the LTE cellular network without sending the GUTI stored in the identity-data memory.

17. The method of claim 14, wherein the first LTE access technology is NB-IoT.

18. The method of claim 14, wherein the second LTE access technology is Cat-M1.

* * * * *